United States Patent [19]

Carroll Jr.

[11] Patent Number: 4,847,033

[45] Date of Patent: Jul. 11, 1989

[54] PROCESS FOR IMPROVING DIMENSIONAL STABILITY OF POLYMERIC FILMS USEFUL IN OPTICAL DISK ASSEMBLIES

[75] Inventor: John F. Carroll Jr., Rochester, N.Y.

[73] Assignee: Eastman Kodak Company, Rochester, N.Y.

[21] Appl. No.: 156,058

[22] Filed: Feb. 16, 1988

[51] Int. Cl.$^4$ .............................................. B29C 71/02
[52] U.S. Cl. ...................... 264/346; 264/1.3; 264/106; 264/342 R
[58] Field of Search ............... 264/342 R, 289.6, 291, 264/106, 107, 346, 1.3

[56] References Cited

U.S. PATENT DOCUMENTS

| | | | |
|---|---|---|---|
| 2,301,222 | 11/1942 | Minich | 264/342 R |
| 2,517,570 | 8/1950 | Irons | 264/342 R |
| 3,257,490 | 6/1966 | Hovermale et al. | 264/298.6 |
| 3,679,791 | 7/1972 | Reade | 264/342 R |
| 4,141,735 | 2/1979 | Schrader et al. | 96/75 |
| 4,160,799 | 7/1979 | Locey et al. | 264/342 R |
| 4,335,173 | 6/1982 | Caraballo | 428/65 |
| 4,365,257 | 12/1982 | Gerfast | 346/135.1 |
| 4,365,258 | 12/1982 | Geyer | 346/137 |
| 4,587,071 | 5/1986 | Minami et al. | 264/298.6 |
| 4,729,805 | 3/1988 | Alexander | 264/291 |

FOREIGN PATENT DOCUMENTS 857167  8/1981  U.S.S.R. .............................. 264/291

OTHER PUBLICATIONS

"Mechanical Performance of Optical Disk Media Fabricated with Stretched Plastic Sheets" by J. Varner, R. Auble, J. Carroll and S. Miller. SPIE vol. 420-Optical Storage Media, 1983.

"Method for Preparing Dimensionally Stable Polymeric Film", Research Disclosure, Item 19809, Oct. 1980, Published by Industrial Opportunities Ltd., Homewell, Havant Hampshire, P09 1EF, United Kingdom.

Primary Examiner—James Lowe
Attorney, Agent, or Firm—Alfred P. Lorenzo

[57] ABSTRACT

The present invention provides a process for improving the dimensional stability of a thermoplastic polymeric film such that it can be used as a flexible support in optical disk assemblies in which maintenance of flatness, smoothness and track configuration of the record layer thereon is essential. This process comprises the steps of: (a) heat treating the film for a time and at a temperature sufficient to achieve a low free volume state; (b) subjecting the film to a substantially uniform omnidirectional tension; and (c) heat treating the film while under such tension for a time and at a temperature sufficient to effect substantial stress relaxation.

17 Claims, No Drawings

PROCESS FOR IMPROVING DIMENSIONAL STABILITY OF POLYMERIC FILMS USEFUL IN OPTICAL DISK ASSEMBLIES

FIELD OF THE INVENTION

The present invention relates to a process for improving the dimensional stability of a thermoplastic polymeric film. Such a film is particularly suitable for use as a support material in a recording element, such as an optical disk assembly designed for high density storage of information by optical writing and/or reading.

BACKGROUND OF THE INVENTION

Optical disk assemblies of the kind described above are useful for storing information in the form of minute, optically-readable deformations which are spaced along spiral or concentric tracks on a disk-shaped storage medium. Such assemblies offer the advantage of increased information capacity over previously used information-storage media such as magnetic tape and microfilm. In general, use of an optical disk recording medium involves forming micrometer-sized information bits (e.g. light-modulating discontinuities) along recording tracks on the surface of the disk. One common way to form such discontinuities in real-time (i.e. So they are readable without an intermediate processing procedure) is to scan the record surface of a disk with a focused beam of radiation (e.g. from a laser) which is turned on and off according to an electrical signal representative of the information to be recorded. The beam thus forms tracks of discrete deformations in the disk record surface. On playback, the tracks are illuminated by a tightly focused reading beam whereby variations in the radiation reflected from deformed and nondeformed track portions are sensed by a photodetector to reproduce the electrical signal.

Although the disk configuration described above is currently the most popular format for such optical storage media, it should be noted that there are useful formats other than the disk. For convenience, the discussion of this invention will refer primarily to the recording elements as optical disk assemblies, with the understanding that the present invention could be utilized in conjunction with equivalent elements.

A troublesome problem with optical disks is the difficulty of maintaining the recording tracks in a highly precise configuration (e.g. concentric circles or convoluting spiral track). This difficulty is more prominent when recording elements are destined for storage and/or use under a wide variety of environmental conditions (i.e. ranging from frigid to tropical temperatures, and arid to humid conditions) over long periods of time (i.e. for archival storage). Such conditions may cause the configurations to change because of dimensional changes in the disk support due to tension loss.

In order to write and read information in the form of the minute markings described hereinabove, optical systems of high numerical aperture are used to focus light to equivalently minute spots. Such optical systems have extremely small depths of focus and the proper positional relationship between the writing or reading optical system and the optical disk record surface must be stringently maintained. Therefore it is highly desirable that the record layer, and thus the optical disk support surface underlying the layer, be smooth and flat. By smooth it is meant that the surface is relatively free of high-spatial-frequency variations from a nominal plane, e.g. such as caused by minute pits or bumps. By flat it is meant that the surface is relatively free of large amplitude, low-spatial-frequency variations, such as caused by undulating surface variation or sags caused by tension loss. Although complex devices can be used to compensate for imperfect smoothness and flatness, these devices are quite expensive and add complication to the whole write/read system.

One approach to achieve requisite smoothness and flatness has been to form the disk support from a rigid material, such as glass with a ground and polished surface. This approach, however, involves time-consuming and costly fabrication procedures. Another approach is to form a plastic disk support with a highly finished surface out of a mold and to apply to the support a surface smoothing sub-layer. However, it is extremely difficult to mold such plastic disks having adequate surface characteristics at high production rates, as this support fabrication method is usually tedious (i.e. piecemeal manufactured).

Still another approach for meeting smoothness and flatness requirements is disclosed in F. F. Geyer and E. M. Leonard, U.S. Pat. No. 4,365,258 issued Dec. 21, 1982. In that approach, an improved optical disk assembly adapted for high density storage of information comprises (i) a flexible, disk-shaped polymeric support web carrying a record layer; (ii) a transparent disk cover sheet opposing the record layer, and (iii) an annular retaining ring for holding the support web and cover sheet, collectively referred to as the web assembly, in a relatively low circumferentially-symmetric tension. The flexible polymeric support materials described as useful include polyester films, such as biaxially-oriented poly(ethylene terephthalate) films.

However, it is well known that most flexible polymeric support materials, such as poly(ethylene terephthalate), are highly responsive to environmental conditions (e.g. temperature, humidity, etc.) during manufacture or use. Further, such materials are subjected to considerable mechanical stresses during manufacture. Such stresses often cause gradual changes to subsequently occur in the materials over a long period of time resulting in dimensional instability. such instability can cause support sag and localized stresses. Efforts are ongoing in industries making and using such materials in film form to improve their dimensional stability, particularly when they are subjected to elevated temperatures.

For instance, in the photographic industry, films of polyesters, e.g. poly(ethylene terephthalate), are often used as supports for various imaging elements, particularly those elements which are subjected to elevated temperatures during either processing or use. Yet, such polyester supports tend to distort in either or both planar dimensions under such conditions. As a result, various manufacturing operations have been devised to improve dimensional stability and to minimize such distortions. Such operations are known in the art as "heat-setting" and "heat-relaxation" operations as described, for example, in U.S. Pat. Nos. 2,779,684 (issued Jan. 29, 1957 to Alles) and 4,076,532 (issued Feb. 28, 1978 to Gottermeier). Generally, such operations involve heating the polymeric film during manufacture, while it is under tension in one or both planar dimensions, at temperatures above the glass transition temperature (Tg) of the polymer for short periods of time.

For some uses of such polymeric films, "heat-setting" and "heat-relaxation" operations do not provide sufficient dimensional stability. Therefore, additional treatment is carried out in some instances. Exemplary additional heat treatments are described in *Research Disclosure*, publication 19809, October, 1980 (published by Industrial Opportunities, Ltd., Homewell, Havant Hampshire PO9 1EF United Kingdom). The treatments described therein generally involve heating the "heat-seat" and "heat-relaxed" film to elevated temperatures (usually greater than the Tg) under various tensioning conditions.

Another polymeric film treatment following "heat-setting" and "heat-relaxation" is described in U.S. Pat. No. 4,141,735 (issued Feb. 27, 1979 to Schrader and Carroll, Jr.). The process described therein involves heating a sheet or roll of polymeric film under certain time and temperature conditions to reduce the tendency of that film to develop core-set curl when stored or used in roll form wound around a core or spool. In effect, this treatment reduces the free volume of the polymeric material so that it reaches a level of stabilization against forming core-set curl faster than it would if left to itself.

Maintaining track configuration, and surface flatness and smoothness in optical disks has proven difficult when flexible polymeric materials are used therein in film form. The dimensional stability of such materials is generally too low for optical disks where distortions on the order of a few micrometers can make the disk worthless. The additional heat treatments devised for treating polymeric films used in the photographic art, described in the references noted hereinabove, do improve dimensional stability to a degree, but insufficiently to reach the critical level of stability required for optical disk supports.

Hence, there is a need in the art for a process for making thermoplastic polymeric materials highly dimensionally stable so that they can be used as support materials in recording elements such as optical disk assemblies.

SUMMARY OF THE INVENTION

The present invention is a process for improving the dimensional stability of a thermoplastic polymeric film such that it can be used as a flexible member (e.g. support) in optical disk assemblies in which maintenance of flatness, smoothness and track configuration in the record layer thereon is essential. This process provides such an improvement that the optical disk assemblies containing such films as supports can be used for high density storage of information for archival purposes. This process provides the dimensional stability which has heretofore not been achievable.

In accordance with this invention, a process for improving the dimensional stability of a thermoplastic polymeric film comprises the steps of: (a) heat treating the film for a time and at a temperature sufficient to achieve a low free volume state; (b) subjecting the film to a substantially uniform omnidirectional tension; and (c) heat treating the film while under such tension for a time and at a temperature sufficient to effect substantial stress relaxation.

To achieve the objectives of this invention, the tension which has been applied to the film as one of the key steps of the process of this invention is permanently maintained during use of the article, for example, the optical disk assembly, in which the film has been incorporated.

DETAILED DESCRIPTION OF THE INVENTION

The present invention can be used to provide high dimensional stability in any flexible film formed from any thermoplastic polymer. Generally, a thermoplastic polymer is one which can be rendered soft and moldable with heat. Examples of thermoplastic polymers include polyesters, e.g. poly(ethylene terephthalate), poly(1,4-cyclohexylene dimethylene terephthalate) and poly(ethylene-2,6-naphthalene dicarboxylate); polycarbonates, e.g. poly((2,2-bias(4-hydroxyphenyl)propane carbonate), and cellulose esters, e.g. cellulose triacetate, cellulose acetate propionate and cellulose acetate butyrate. The practice of this invention, however, is not limited to these polymers. The polymeric films can contain, or be coated with layers containing, various addenda typically used in the art, including dyes, pigments, brighteners, antioxidants, stabilizers, antiblocking agents, etc.

Typically, the thermoplastic polymers which can be extruded into film form and used in the practice of this invention have a glass transition temperature (Tg) greater than 2020 C. (which is roughly ambient room temperature in temperate climates of the world). Preferably, the Tg is greater than about 50° C. A preferred thermoplastic polymer, semi-crystalline biaxially-oriented, heat-set and heat-relaxed poly(ethylene terephthalate), has a glass transition temperature of about 100° C. Glass transition temperature can be determined by any suitable technique such as, for example, differential thermal analysis, the details of which are given in U.S. Pat. No. 4,141,735 (Schrader et al) noted hereinabove and references mentioned therein.

Although the thermoplastic polymeric films acted upon in the practice of this invention are intended for use in circular recording elements, such as optical disk assemblies, they can be adapted for use in the photographic arts as supports for various imaging elements of other types. In such cases, the films may be acted upon as square or rectangular sheets or as continuous webs instead of in circular form.

In a specific embodiment, the highly dimensionally stable films prepared with this invention are particularly useful as self-supporting record layers, support materials or cover sheet materials in optical disk assemblies which are described in more detail hereinbelow.

The process of this invention comprises three essential steps, but additional manufacturing steps (e.g. coating operations) may be utilized if desired. The first essential step comprises heat treating the film for a time and at a temperature sufficient to achieve a low free volume state. As used in this specification and in the claims, the term "low free volume state" refers to the state of a polymeric film wherein "free volume" (sometimes called "excess volume") has been reduced to less than about 25 percent of original free volume before heat treating. Preferably, the heat treating step (a) of this invention reduces the film free volume to essentially that of its equilibrium glassy state. The scientific details of free volume and techniques of its measurement are described in numerous references including, for example, *Polymeric Materials*, published by American Society for Metals, Metals Park, Ohio, 44073, Chapter 2 entitled "The Problem of Thermodynamic Equilibrium in Glassy Polymers" by S. E. B. Petrie; *J. Poly Sci.: A*-2, 10, pp. 1255–1272 (1972); and references mentioned therein.

The reduction of free volume to its lowest, i.e. equilibrium, state is essential to providing a highly dimensionally stable polymeric film. Without this step, a polymeric film would lose its free volume over a long period of time. This gradual loss might be acceptable if a film user is willing to wait indefinitely for the film to stabilize. On the other hand, if the film user puts the film in a tensioned environment prior to equilibrating the free volume loss, the film would eventually sag considerably and likely become useless.

The specific temperatures and times for heat treating films in step (a) are subject to variation and are somewhat dependent upon the composition of the film and any layers thereon. There are many sets of operable conditions possible. The optimum conditions for a desired level of free volume in a minimum treatment time can be readily determined by routine experimentation. Typically, the higher the temperatures, the shorter the time required for the treatment; and the converse is true also.

The treatment temperature ($T_1$) generally ranges from greater than 20° C. up to just below the film Tg. Heating above the Tg usually increases the free volume rather than reducing it. Preferably, $T_1$ is from about 35° C. to about 5° C below the Tg. In the case of poly(ethylene terephthalate) film, the optimum temperature is in the range of from about 70° to about 85° C.

The time of treatment can also be varied considerably, depending upon $T_1$, but typically it ranges from about 1 to about 48 hours, and preferably from about 10 to about 24 hours. For treating poly(ethylene terephthalate) film, the optimum time ranges from about 20 to about 24 hours.

The heating during step (a) preferably is carried out substantially at a constant temperature during the entire treatment period, after the film has been brought to the desired optimum temperature range. The heat treated film can then be cooled to ambient temperature, if desired, without substantial increase in free volume.

Step (a) can be carried out to advantage while the film is in either sheet or roll form. Preferably, for manufacturing efficiencies, the heat treatment is carried out while the film is in roll form. For example, the film can be a stock roll of polymeric film wound on a suitable core.

The film subjected to step (a) can be a self-supporting record layer. Alternatively and more preferably, the film has one or more layers thereon, which layers are adapted for recording information, as in optical disk assemblies. Particular record layer compositions which can be applied to the film support prior to heat treatment are described in more detail hereinbelow.

Step (a) can be carried out while the film is under any level of tension, as the level of tension is not critical as long as the film is not torn or stretched. Preferably, however, the film is in a substantially tension-free state while heat treated. In other words, it is under little or no tension.

The humidity at which step (a) can be carried out is also subject to variation. It is advantageous, however, for the treatment to be carrie d out at a low relative humidity (R.H.), e.g. less than about 25%, in order to protect any layers coated on the film support.

Following the heat treatment of step (a), the polymeric film is subjected to substantially uniform omnidirectional tension. As used in this specification and in the claims, the phrase "uniform omnidirectional tension" refers to a tension which is applied in such a way as to be uniform in all directions. If a film in sheet form is treated, this means that a tension is applied around its perimeter in a manner to subject each point in the film surface to uniform tension. Such tensioning can be accomplished by any suitable tension means, e.g. clamps, frame, etc.

In a preferred embodiment, this tensioning step is used to place a circular element of film having a center and a circumference at a radial distance therefrom under circumferentially-symmetric tension, i.e. tension uniformly applied around the circumference of the film element. This tension can be applied before, after or simultaneous with forming the circular element. Preferably, The element is subjected to the tension while it is being formed, as could occur when the circular element is formed out of a film web in a suitable manner. Tension can be applied to the circular element in any suitable manner, using clamping means, etc. For the optical disk assemblies described herein, the tension is typically applied by affixing the circular element in an annular retaining ring which is described in more detail hereinbelow.

The level of tension applied in step (b) is not critical and depends upon the elastic limit (i.e. yield point) of the particular film and the degree of planarity desired. Typically, the tension is below the elastic limit of the material, and, for polyethylene terephthalate, can be, for example, in the range of from about 2 to about 10 lbs/inch (350 to 1750 N/m), but preferably from about 3 to about 6 lbs/inch (525 to 1050 N/m). For an optical disk assembly having an annular retaining ring, the tension is generally from about 4 to about 5 lbs/inch (700 to 875 N/m).

The third essential step of the process of this invention involves heat treating the polymeric film while it is maintained under the substantially uniform omnidirectional tension applied in step (b). This treatment is carried out for a time and at a temperature sufficient to effect substantial stress relaxation. As used in this specification and in the claims, the term "stress relaxation" refers to relaxation or diminishing of the tendency or driving force in the film to shrink when subjected to subsequent elevated temperatures. This tendency to shrink may not be uniform in the film, so the object of step (c) is not only to relieve that tendency but also to redistribute any localized stress in the film to make the film stress uniform throughout. Stress relaxation is discussed briefly in U.S. Pat. No. 4,160,799 (issued July 10, 1979 to Locey et al) in relation to the known "heat relaxation" operation in conventional film manufacturing. Yet, the important and critical difference between step (c) of this invention and conventional "heat relaxation" is that the film is treated in step (c) while under the uniform omnidirectional tension applied in step (b). Conventional "heat relaxation" of film webs employs little if any tension in the longitudinal dimension in order to allow a certain amount of film web shrinkage. Also, without step (a) to reduce the free volume, the tension in step (c) may not stabilize until it has relaxed to a value which is too low to be useful.

As in step (a), the specific temperature and times for heat treating films in step (c) are subject to variation and are somewhat dependent upon the composition of the film and any layers thereon. There are many sets of operable conditions possible. The optimum conditions for a desired level of stress relaxation in a minimum treatment time can be readily determined by routine experimentation. Typically, the higher the temperature, the shorter the time required for the treatment; and the converse is true also.

The treatment temperature ($T_2$) utilized in step (c) generally ranges from greater than 20° C. up to just below the film Tg. Preferably, $T_2$ is from about 50° to about 75° C. In the case of poly(ethylene terephthalate) film, the optimum temperature is in the range of from about 65° to about 70° C. Although it is not necessary, it may be desired in certain manufacturing operations for $T_2$ to be equal to $T_1$, or for the two treatment temperatures to be within a few degrees of each other.

The time of heat treatment in step (c) can also be varied considerably, depending upon $T_2$, but typically it ranges from about 1 to about 24 hours, and preferably from about 1 to about 12 hours. For treating poly(ethylene terephthalate) film, the optimum time ranges from about 8 to about 12 hours.

The heating during step (c) preferably is carried to substantially at a constant temperature during the entire treatment period, after the film has been brought to the desired optimum temperature range. The heat treated film in its tensioned state can then be cooled to ambient temperature, if desired, without substantial increase in stress.

The humidity conditions during step (c) are not critical. However, it is preferred that the relative humidity be kept relatively low, i.e. less than about 15 percent, and more preferably in the range of from about 5 to about 12 percent in order to help maintain the tension applied in step (b), and avoid adverse chemical effects on any applied coatings.

In a preferred embodiment of this invention, improved dimensional stability of a thermoplastic polymeric film having a Tg greater than 20° C. which is useful as a support for an optical disk assembly can be provided by a process comprising the steps of:

(a) heat treating a roll of the film in a substantially tension-free state at a temperature ($T_1$) greater than 20° C. and less than the Tg for a time sufficient to achieve a low free volume state;

(b) forming a circular element from the film, which element has a center and a circumference at a radial distance from the center;

(c) applying a substantially circumferentially-symmetric tension to the element by mounting it within an annular retaining ring; and (d) heat treating the mounted element at a temperature ($T_2$) greater than 20° C. and less than the Tg for a time sufficient to effect substantial stress relaxation.

As a result of this process, the difference in radial movement between any two points on a circle of points located about the center and less than or equal to the radial distance from the center is less than about 30 micrometers, and preferably less than about 15 micrometers, when the mounted element is subjected to a temperature of up to about 60° C.

The process of this invention finds particularly advantageous application in the improvement of a flexible polymeric film incorporated within an optical disk assembly. It is readily and conveniently incorporated as a part of the overall sequence of manufacturing steps required to produce such an assembly. The manufacturing operations themselves are not critical to this invention as long as the particular steps of the process of this invention are performed at some point in the indicated sequence.

The optical disk assemblies in which the polymeric films treated as described are especially useful include a continuous, flexible, disk-shaped polymeric support having a record layer and other appropriate layers formed on one major surface thereof. The assembly also includes a continuous, flexible, disk-shaped polymeric cover sheet which is substantially transparent with respect to the write and/or read wavelength suitable for use with the record layer. The diameter of the support generally corresponds to the diameter of the cover sheet. The support and cover sheet are referred to hereinafter as the web assembly.

The support and cover sheet are held in spaced relation by an annular retaining ring which engages the web assembly substantially continuously around the circumferential peripheral portion thereof. The record layer has a predetermined annular information storage region radially inwardly of the retaining ring.

The web assembly is retained in uniform omnidirectional tension (i.e. circumferentially-symmetric tension) by cooperating annular ring members of the retaining ring. Such tension is permanently maintained by the retaining ring throughout the useful life of the optical disk assembly. Preferably, the cooperative engagement between the support, the cover sheet and the retaining ring significantly seals the space between the record layer and the opposed surface of the cover sheet.

In additional to being particularly useful in improving the properties of the support for the record layer, the process of this invention is also particularly useful in improving the properties of the cover sheet to obtain a taut film that will not sag under conditions of high temperature and relative humidity.

Further details and characteristics of optical disk assemblies, suitable support and cover sheet materials, and several examples of suitable annular retaining rings are provided in the aforementioned U.S. Pat. No. 4,365,258, the disclosure of which is incorporated herein by reference.

As used in this specification and in the claims, the term "flexible" is intended to mean susceptibility to bending without breaking under the influence of any of a wide range of pressure and is not intended to be limited to any narrow degree of such susceptibility.

Generally, the flexible support is formed of a thermoplastic polymeric material as described hereinabove, which has a relatively high melting point (to avoid heat deformation during recording). Has a smooth surface and is capable of being coated with a record layer with good adhesion and no significant adverse chemical reactivity between the record layer and the support. Also, if it is desirable for the support to be reflective, then it must either comprise a material which is itself reflective to the optical reading device of choice, or it must have superposed thereon a thin flexible layer of reflective material (e.g. a reflective layer of aluminum, bismuth, rhodium or the like), before the record layer is applied.

The record layer comprises a flexible recording-sensitive material, many of which are known in the optical disk art. Examples include thin metal films (e.g. tin or tantalum); a photoresist material; certain organic materials (e.g. 4-phenyl-azo-1-naphthylamine); a deformable organic material (e.g. the dye Iosol Red); a dye and a binder (e.g. the dye Sudan IV in cellulose nitrate); or the like. The thickness of the record layer is subject to variation depending upon the recording-sensitive material and the recording method chosen.

The optical disk assembly can contain various other layers, if desired, including cushioning layers, encompassing layers, etc. as are known in the art, e.g. U.S. Pat.

No. 4,335,173 (issued June 15, 1982 to Caraballo), the disclosure of which is incorporated herein by reference.

The invention has been described in detail with particular reference to preferred embodiments thereof, but it will be understood that variations and modifications can be effected within the spirit and scope of the invention.

I claim:

1. A process for improving the dimensional stability of a thermoplastic polymeric film, said process comprising the steps of:
   (a) heat treating said film for a time and at a temperature, below the glass transition temperature of said film, sufficient to achieve a low free volume state;
   (b) subjecting said film to a substantially uniform omnidirectional tension; and
   (c) heat treating said film while under said tension for a time and at a temperature, below the glass transition temperature of said film, sufficient to effect substantial stress relaxation.

2. A process for improving the dimensional stability of a thermoplastic polymeric film to be used as a flexible support in a recording element, said process comprising the steps of:
   (a) heat treating a thermoplastic polymeric film, which has a glass transition temperature (Tg) greater than 20° C., at a temperature ($T_1$) greater than 20° C. and less than said Tg for a time sufficient to achieve a low free volume state;
   (b) applying a substantially uniform omnidirectional tension to said film; and
   (c) heat treating said film while under said tension at a temperature ($T_2$) greater than 20° C. and less than said Tg for a time sufficient to effect substantial stress relaxation.

3. The process of claim 2 wherein said thermoplastic polymeric film is composed of a polyester having a Tg greater than about 50° C.

4. The process of claim 3 wherein said polyester is poly(ethylene terephthalate).

5. The process of claim 4 wherein said tension is in the range of from about 350 to about 1750 N/m.

6. The process of claim 2 wherein said step (a) reduces the free volume of said film to essentially that of its equilibrium glassy state.

7. A process for improving the radial dimensional stability of a flexible, thermoplastic polymeric film useful as a support in a recording element,
   said process comprising the steps of:
   (a) heat treating said film in a substantially tension-free state for a time and at a temperature, below the glass transition temperature of said film, sufficient to achieve a low free volume state;
   (b) forming a circular element of said film while applying substantially circumferentially-symmetric tension; and
   (c) heat treating said circular element while under said tension for a time at a temperature, below the glass transition temperature of said film, sufficient to effect substantial stress relaxation.

8. The process of claim 2 wherein said step (a) is carried out while said film is in a substantially tension-free state.

9. The process of claim 7 wherein said tension is provided with an annular retaining ring.

10. The process of claim 7 wherein said film comprises a record layer.

11. A process for improving the dimensional stability of a thermoplastic polymeric film having a glass transition temperature greater than 20° C., said film being useful as a support for an optical disk assembly,
    said process comprising the steps of:
    (a) heat treating a roll of said film in a substantially tension-free state at a temperature ($T_1$) greater than 20° C. and less than said Tg for a time sufficient to achieve a low free volume state;
    (b) forming a circular element from said film, said circular element having a center and a circumference at a radial distance from said center;
    (c) applying a substantially circumferentially-symmetric tension to said circular element by mounting it within an annular retaining ring; and
    (d) heat treating said mounted element at a temperature ($T_2$) greater than 20° C. and less than said Tg for a time sufficient to effect substantial stress relaxation, whereby the difference in radial movement between any two points on a circle of points located about said center and less than or equal to said radial distance from said center is less than about 30 micrometers when said mounted element is subjected to a temperature of up to about 60° C.

12. The process of claim 11 wherein $T_1$ is in the range of from about 35° C. to about 5° C. below said Tg.

13. The process of claim 11 wherein $T_2$ is in the range of from about 50° to about 75° C.

14. The process of claim 11 wherein the time of said step (a) is in the range of from about 1 to about 48 hours, and the time of said step (d) is in the range of from about 1 to about 24 hours.

15. The process of claim 1 comprising forming a record layer on said film prior to step (a).

16. The process of claim 11 wherein said polymeric film is a polyester.

17. The process of claim 16 wherein said polyester is poly(ethylene terephthalate).

* * * * *